(No Model.)
P. HATHAWAY.
ELECTRIC PUSH BUTTON.
No. 434,596. Patented Aug. 19, 1890.
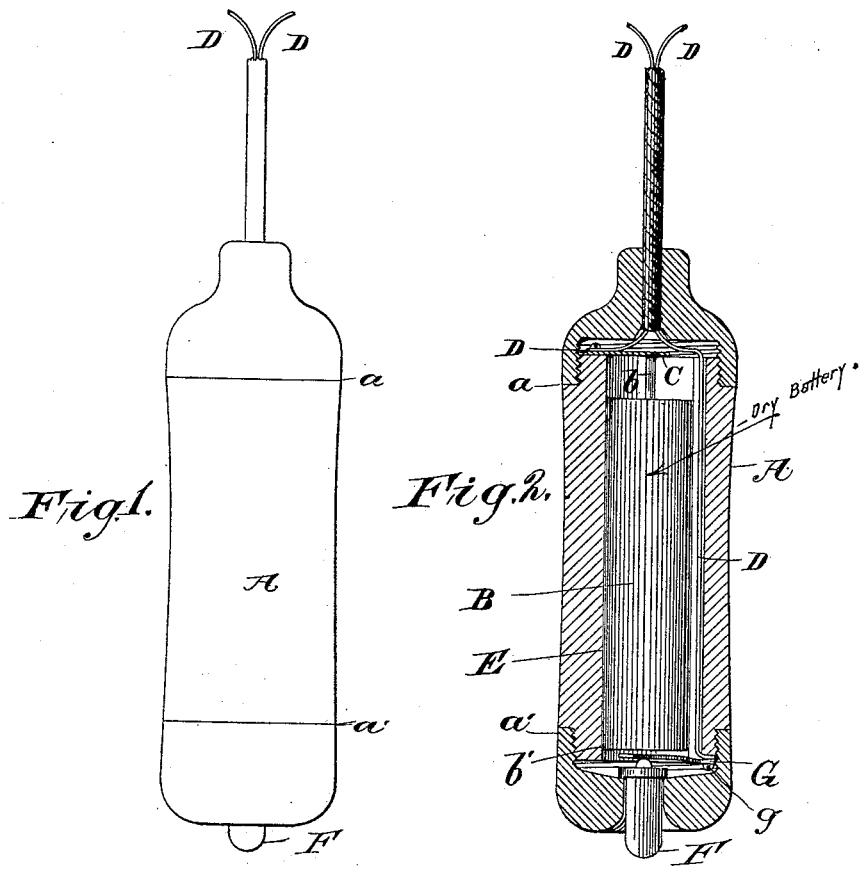
Attest:
C. O. Benjamin
J. R. Hard.
Inventor.
Philip Hathaway

UNITED STATES PATENT OFFICE.

PHILIP HATHAWAY, OF NEW YORK, N. Y.

ELECTRIC PUSH-BUTTON.

SPECIFICATION forming part of Letters Patent No. 434,596, dated August 19, 1890.

Application filed May 24, 1890. Serial No. 353,002. (No model.)

*To all whom it may concern:*

Be it known that I, PHILIP HATHAWAY, a citizen of the United States, and a resident of the city, county, and State of New York, have invented certain new and useful Improvements in the Construction of Electrical Push-Buttons or Circuit-Closers, of which the following is a specification.

The object of my invention is to combine a push-button or circuit-closer with an electric battery in such a manner as that they shall be connected together permanently and contained in the same case without any material increase of the size of such case. When so combined, the battery and push-button are capable of ready and convenient attachment to an electric call-bell or annunciator either before or after such bell is placed in position, or when desired the whole electrical apparatus can be conveniently used as a portable electrical call-bell.

I construct my combined battery and circuit-closer as follows: I use preferentially a dry chloride of silver battery, such form of battery being found to give the largest electrical force in proportion to the space which it occupies, and I insert such battery within the case which contains the circuit-closing mechanism in such a manner as to be wholly concealed from view and fully protected from external injury, and I connect the battery, the circuit-closing mechanism, and the line-wires of the call-bell in such a manner as to form an electric circuit normally open, but capable of being closed when the push-button is pressed in the ordinary way when an alarm is desired.

In the drawings annexed I have shown my invention as applied to a portable push-button. I do not confine myself to the form therein shown, as it is obvious that my invention is capable of ready adaptation to any form of push-button circuit-closer that it may be desired to use, whether portable or fixed.

In the drawings, Figure 1 is a view of a portable push-button containing the battery and the circuit-closing mechanism. Fig. 2 is a section of Fig. 1.

In the figures, A is the case of the push-button, constructed to unscrew at points $a$ and $a'$ to allow of the introduction of the battery and to facilitate the connecting of the line-wires.

B is a dry chloride of silver battery, with $b$ a silver wire forming the positive electrode and $b'$ a zinc case forming the negative electrode.

C is a metallic spring having a permanent electrical connection with one of the line-wires in electrical circuit with the call-bell.

D D are the line-wires forming part of the electrical circuit in which the call-bell is placed.

E is a chamber in the case A, in which the battery is placed, such chamber being closed at the points $a\ a'$ by screw-caps, which form the ends of the case A.

F is a push of the usual construction, and G a metallic spring fixed to the base of the chamber E and pivoted on the screw $g$, so as to allow of the ready insertion and withdrawal of the battery.

In operating my invention the spring C is permanently connected with one of the line-wires D, which are preferably in the form of an ordinary two-wire flexible insulated cable, and the other line-wire D is permanently connected with the spring G. The battery B is then inserted in the chamber E, the spring G moved on its pivot into the position shown in the drawings, and the end caps screwed on. The line-wires D D are then connected in the usual way with the magnets of the call-bell, and the electrical call-bell apparatus is ready for use. When an alarm is desired, the spring G is pressed forward by the push F against the base of the zinc electrode $b'$ of the battery, making electrical contact therewith, and simultaneously the silver electrode $b'$ is pressed against and makes electrical contact with the spring C and the electrical circuit is closed. On cessation of the pressure the spring G is released, thereby bringing it out of contact with the battery and carrying the push F back to its normal position.

Having thus described the nature of my invention, what I claim, and desire to secure by Letters Patent, is—

1. In an electrical call-bell apparatus, the combination of a case constructed to contain a battery, circuit-closing mechanism, and connections with the line-wires of a call-bell, a dry battery placed loosely in such case and movable between two contact-points, and means for pressing the electrodes of such battery against the surfaces of such contact-points, all substantially as described, and as and for the purposes specified.

2. In a combined battery and circuit-closer, the combination of the battery-containing chamber E, furnished with caps at the points $a\ a'$ for the introduction and removal of the battery, the movable dry battery B, the contact-points C G, and means for pressing the movable battery B against the surfaces of such contact-points, all substantially as described.

3. In a combined battery and circuit-closer, the combination of the case A, the movable dry battery B, the push F, the fixed spring C, permanently connected with one of the line-wires of the circuit, and the movable spring G, pivoted for the insertion and withdrawal of the battery, all substantially as described.

PHILIP HATHAWAY.

Witnesses:
J. R. HARD,
EDWIN M. FOX.